United States Patent
Donohue

(10) Patent No.: US 11,388,259 B2
(45) Date of Patent: Jul. 12, 2022

(54) SYSTEM AND METHOD FOR EVALUATING DIGITAL USER EXPERIENCE IN USER SESSION

(71) Applicant: ISKY RESEARCH PTE. LTD, Singapore (SG)

(72) Inventor: Mark Edward Donohue, Singapore (SG)

(*) Notice: Subject to any disclaimer, the term of this patent is extended or adjusted under 35 U.S.C. 154(b) by 0 days.

(21) Appl. No.: 17/407,290

(22) Filed: Aug. 20, 2021

(65) Prior Publication Data

US 2022/0060566 A1 Feb. 24, 2022

(30) Foreign Application Priority Data

Aug. 21, 2020 (GB) ................................ 2013114

(51) Int. Cl.
| | |
|---|---|
| *H04L 67/75* | (2022.01) |
| *G06F 9/451* | (2018.01) |
| *H04L 67/50* | (2022.01) |
| *G06F 3/048* | (2013.01) |
| *G06F 3/14* | (2006.01) |

(52) U.S. Cl.
CPC .............. *H04L 67/36* (2013.01); *G06F 3/048* (2013.01); *G06F 3/14* (2013.01); *G06F 9/451* (2018.02); *H04L 67/22* (2013.01)

(58) Field of Classification Search
None
See application file for complete search history.

(56) References Cited

U.S. PATENT DOCUMENTS

| | | | |
|---|---|---|---|
| 2011/0128288 A1* | 6/2011 | Petrou ................... | G06F 16/434 345/428 |
| 2012/0124035 A1* | 5/2012 | Vaidyanathan ........ | G06F 16/903 707/723 |
| 2012/0124519 A1* | 5/2012 | Uphoff .................. | G06F 16/903 715/811 |
| 2013/0073568 A1* | 3/2013 | Federov ............. | G06Q 30/0269 707/749 |
| 2016/0188719 A1* | 6/2016 | Glover .................. | G06F 16/285 707/706 |
| 2018/0063276 A1* | 3/2018 | Foged ...................... | H04W 4/80 |
| 2018/0188906 A1* | 7/2018 | Carter .................... | G06F 3/0482 |
| 2018/0189077 A1* | 7/2018 | Gupta ................... | G06F 3/0482 |
| 2020/0026400 A1* | 1/2020 | Deselaers ............. | G06F 3/0481 |
| 2020/0322240 A1* | 10/2020 | Perkins ............... | H04L 47/2483 |
| 2021/0256366 A1* | 8/2021 | Zhao ....................... | G06N 3/08 |

* cited by examiner

*Primary Examiner* — Toan H Vu
(74) *Attorney, Agent, or Firm* — RC Trademark Company

(57) ABSTRACT

A system for evaluating digital user experience in a user session includes a server communicatively coupled to user devices. The server acquires usage information of different applications of service providers associated with common service from user devices and analyses the usage information to determine a set of scores for each of the different applications. The analysis of usage information includes detecting and discarding a portion of the usage information for one or more first user interfaces of each application that do not require any user input. The server further determines a friction score for a given journey for each of the different applications and generates first visual representation. The server further controls display of generated first visual representation such that a ranking of the different applications of different service providers is indicated in accordance with the determined friction score.

20 Claims, 11 Drawing Sheets

| Usage Information 304A | Service Providers 302A to 302N | | | | |
|---|---|---|---|---|---|
| | 302A | 302B | 302C | ••• | 302N |
| | USA | USA | USA | | UK |
| Time 304B | 0m 25s | 1m 27s | 0m 49s | | 1m 52s |
| Number of Fields 304C | 3.0 | 2.0 | 2.0 | | 2.0 |
| Swipes 304D | 0.0 | 0.0 | 0.0 | | 0.0 |
| Wipes 304E | 0.0 | 0.0 | 0.0 | | 0.0 |
| Clicks 304F | 4.0 | 6.0 | 4.0 | | 9.0 |
| Screens 304G | 6.0 | 5.0 | 3.0 | | 8.0 |
| Security 304H | 4.0 | 2.0 | 2.5 | | 4.5 |
| Total Friction Score 304I | 17.0 | 15 | 11.5 | | 23.5 |
| Rank 304J | 3 | 2 | 1 | | N |

FIG. 3A

| Usage Information 304A | Service Providers 302A to 302N | | | | |
|---|---|---|---|---|---|
| | 302A | 302B | 302C | • • • | 302N |
| | USA | USA | USA | | UK |
| Time 304B | 0m 3s | 0m 14s | 0m 11s | | 0m 17s |
| Number of Fields 304C | 0.0 | 0.0 | 0.0 | | 0.0 |
| Swipes 304D | 0.0 | 0.0 | 0.0 | | 0.0 |
| Wipes 304E | 0.0 | 0.0 | 0.0 | | 0.0 |
| Clicks 304F | 1.0 | 2.0 | 2.0 | | 3.0 |
| Screens 304G | 2.0 | 3.0 | 3.0 | | 3.0 |
| Security 304H | 0.5 | 0.5 | 0.5 | | 0.5 |
| Total Friction 304I | 3.5 | 5.5 | 5.5 | | 6.5 |
| Rank 304J | 1 | 2 | 2 | | N |

FIG. 3B

| Journeys 306A | Service Provider 302A to 302N ||||| 
|---|---|---|---|---|---|
| | 302A | 302B | 302C | ••• | 302N |
| | USA | USA | USA | | UK |
| Register device 306B | 17.0 | 15.0 | 11.5 | | 23.5 |
| View Last Trans. 306C | 3.5 | 5.5 | 5.5 | | 6.5 |
| Transaction Search 306D | N/A | 21.5 | 6.5 | | N/A |
| Add payee 306E | 14.5 | 20.5 | 16.5 | | 16.5 |
| Make payment 306F | 13.0 | 12.5 | 15.5 | | 15.5 |
| Lock Debit Card 306G | 7.5 | 9.5 | 11.5 | | 15.5 |
| Apply Credit Card 306H | N/A | 19.5 | 21.5 | | N/A |
| Average 306I | 13.2 | 14.7 | 14.9 | | 15.0 |
| Rank 306J | 1 | 2 | 3 | | N |

FIG. 3C

SYSTEM AND METHOD FOR EVALUATING DIGITAL USER EXPERIENCE IN USER SESSION

CROSS-REFERENCE TO RELATED APPLICATIONS/INCORPORATION BY REFERENCE

This Application claims priority to and claims benefit from the United Kingdom Patent Application Ser. No GB2013114.0 filed on Aug. 21, 2020. The above-referenced Application is hereby incorporated herein by reference in its entirety.

FIELD OF TECHNOLOGY

The present disclosure relates generally to the field of user experience evaluation; and more specifically, to a system and a method for evaluating a digital user experience in a user session.

BACKGROUND

In recent times, the use of computers and related computing devices has increased dramatically. A user generally interacts with computers through user interfaces via software applications, which enable the communication between the user and the computers. Easy and pleasant to use user interfaces provide a significantly better user experience. Any factor that inhibits the user from intuitively and painlessly achieving their goals or completing a particular task with the user interface is desired to be minimized. It may be appreciated that such factors, namely friction points, are a major problem with the user interface in providing an overall better user experience as it leads to bouncing, reduces conversions, and frustrates existing and would-be users (e.g., customers) to the point of abandoning their tasks.

However, presently it is technically challenging to quantify and compare the user experience of different user interfaces, i.e., provided by different vendors of a similar type, to judge which user interface provides a better user experience without using it in practice. It may be useful for the user to know which user interface provides a better user experience. The knowledge of the user experience may help the user in making decisions regarding the choice of a user interface to complete a particular task as there might be multiple options available for the user. For example, the time taken to perform a particular task using a given user interface may be a prominent deciding factor of the practical usability of such a user interface. Furthermore, existing systems and methods do not capture user interactions meaningfully or may capture wrong data, and thus the digital user experience determined may be inaccurate and unreliable.

Further limitations and disadvantages of conventional and traditional approaches will become apparent to one of skill in the art through comparison of such systems with some aspects of the present disclosure, as set forth in the remainder of the present application with reference to the drawings.

BRIEF SUMMARY OF THE DISCLOSURE

The present disclosure provides a system and a method for evaluating a digital user experience in a user session. The present disclosure seeks to provide a solution to the existing problem of inaccurate and unreliable digital user experience determined by existing systems and methods. The system and method of the present disclosure improve the way the digital user experience is evaluated automatically and efficiently for different user interfaces provided by service providers with improved accuracy and reliability.

In one aspect, the present disclosure provides a system for evaluating a digital user experience in a user session, wherein the system comprises a server communicatively coupled to a plurality of user devices, wherein the server is configured to:

acquire, from the plurality of user devices, usage information of a plurality of different applications of a plurality of different service providers associated with a common service, wherein the usage information of each application is indicative of a plurality of user interactions with a plurality of user interfaces of each application during the user session;

analyze said usage information to determine a set of scores for each of the plurality of different applications, wherein each score of the set of scores is determined for each of the plurality of user interactions in a given journey of accessing a corresponding application, and wherein the analysis of said usage information comprises detecting and discarding a portion of usage information for one or more first user interfaces of each application that do not require any user input;

determine a friction score for the given journey for each of the plurality of different applications associated with the common service based on the determined set of scores;

generate a first visual representation that comprises the plurality of user interactions, the determined set of scores corresponding to the plurality of user interactions, and the determined friction score for the given journey for each of the plurality of different applications; and control display of the generated first visual representation such that a ranking of the plurality of different applications of the plurality of different service providers associated with the common service is indicated in accordance with the determined friction score for the given journey for each of the plurality of different applications.

In another aspect, the present disclosure provides a method for evaluating a digital user experience in a user session, the method comprising:

acquiring, from plurality of user devices, usage information of a plurality of different applications of a plurality of different service providers associated with a common service, wherein the usage information of each application is indicative of a plurality of user interactions with a plurality of user interfaces of each application during the user session;

analyzing said usage information to determine a set of scores for each of the plurality of different applications, wherein each score of the set of scores is determined for each of the plurality of user interactions in a given journey of accessing a corresponding application, and wherein the analysis of said usage information comprises detecting and discarding a portion of usage information for one or more first user interfaces of each application that do not require any user input;

determining a friction score for the given journey for each of the plurality of different applications associated with the common service based on the determined set of scores;

generating a first visual representation that comprises the plurality of user interactions, the determined set of scores corresponding to the plurality of user interactions, and the determined friction score for the given journey for each of the plurality of different applications; and controlling display of the generated first visual representation such that a ranking of the plurality of different applications of the plurality of different service providers associated with the common service is indicated in accordance with the determined friction score for the given journey for each of the plurality of different applications.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features, and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 3A is an illustration of a first exemplary scenario of implementation of the system and method for evaluating a digital user experience in a user session for a banking sector, in accordance with an embodiment of the present disclosure;

FIG. 3B is an illustration of a second exemplary scenario of implementation of the system and method for evaluating a digital user experience in a user session for a banking sector, in accordance with an embodiment of the present disclosure;

FIG. 3C is an illustration of a third exemplary scenario of implementation of the system and method for evaluating a digital user experience in a user session for a banking sector, in accordance with an embodiment of the present disclosure;

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF THE DISCLOSURE

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1A:
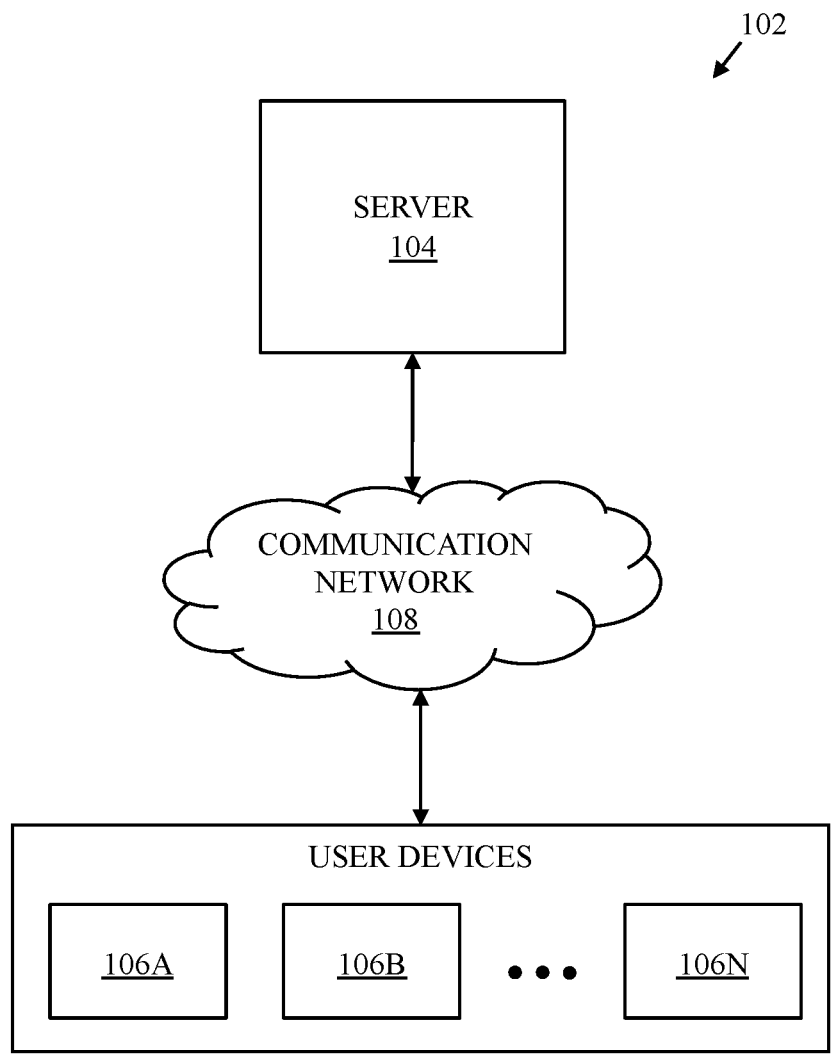
FIG. 1A is a block diagram of a system for evaluating a digital user experience in a user session, in accordance with an embodiment of the present disclosure.

FIG. 1A is a block diagram of a system for evaluating a digital user experience in a user session, in accordance with an embodiment of the present disclosure. With reference to FIG. 1A, there is shown a block diagram of a system 102. The system 102 includes a server 104 communicatively coupled to a plurality of user devices 106A to 106N via a communication network 108.

The present disclosure provides the system 102 for evaluating a digital user experience in a user session, where the system 102 enables the quantification of the user experience of different user interfaces of similar types. Such quantification of the user experience facilitates a given user to know which user interface provides a better user experience without actually using the user interface. The user interface providing comparatively better user experience may also save time for the user in completing a particular task. Further, the user interface with a better user experience may also provide a more intuitive and pleasant experience to the user. Beneficially, the user can choose a better service provider with a better user interface for enhanced user experience. Moreover, the service provider can also improve their service in terms of user experience based on the generated friction score.

Throughout the present disclosure, the term "user session" refers to a session in which a user interacts with a service (provided via a web page or a software application).

Throughout the present disclosure, the term "service" refers to various online and offline services provided by the banks, public services, insurance services, or other service providers, such as retail stores. The term service may also include services associated with operating one or more devices that belong to a particular industry, such as the usage of user interfaces to operate a robotic device. The service may include but is not limited to facilities or utilities provided through websites, webpages, application interfaces, dedicated software, or combination thereof. For example, in the case of services associated with a bank, the service may include but not be limited to opening an account, ordering a product, making a payment, registering a user, registering a new device, adding information, doing customer verification etc. In an example, the service further includes registering a new device for controlling a robotic device in hospitals.

Throughout the present disclosure, the term "digital user experience" refers to the user's emotions and attitudes about using a particular user interface, product, system, or service. The digital user experience may include practical, experiential, affective, meaningful, and valuable aspects of the user's interaction. Additionally, it may include the user's perception of aspects such as utility, ease of use and efficiency to perform a particular task, such as providing destination location.

Throughout the present disclosure, the term "friction score" refers to an accumulated score determined based on friction present in any user experience. The friction score is determined by the server 104 for evaluating a digital user experience in a user session as disclosed in the present disclosure. In an example, friction herein refers to any resistance experienced by a user while using a given application during a user session for executing a given task like providing destination location to an autonomous vehicle.

The server 104 includes suitable logic, circuitry, interfaces, and code that may be configured to communicate with the plurality of user devices 106A to 106N via communication network 108. In an example, the server 104 may be a remote cloud server that is managed by a third party different from the service providers associated with a plurality of different applications of a plurality of different service providers. In another example, the server 104 may be a remote server or a data center that is managed by a third party, or jointly managed, or managed in coordination and association with one or more of the plurality of different service providers. In an implementation, the server 104 may be a master server or a master machine that is a part of a data center that controls an array of other cloud servers communicatively coupled to it for load balancing, running customized applications, and efficient data management.

Each of the plurality of user devices 106A to 106N, such as user device 106A, refers to an electronic computing device that may execute and run various types of applications to perform a given computational task. The user device, such as the user device 106A, may or may not be a handheld device. Each of the plurality of user devices 106A to 106N, such as user device 106A, may include but not limited to a mobile device, a smartphone, a desktop computer, a laptop computer, a Chromebook, a tablet computer, a robotic device, or a specialized dedicated device, e.g., a point-of-sale (POS) machine, etc.

The communication network 108 includes a medium (e.g., a communication channel) through which the plurality of user devices 106A to 106N communicates with the server 104. The communication network 108 may be a wired or wireless communication network. Examples of the communication network 108 may include, but are not limited to, a Wireless Fidelity (Wi-Fi) network, a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), a Metropolitan Area Network (MAN), and/or the Internet.

In operation, the server 104 is configured to acquire, from the plurality of user devices 106A to 106N, usage information of a plurality of different applications of a plurality of different service providers associated with common service. The usage information of each application is indicative of a plurality of user interactions with a plurality of user interfaces of each application during the user session. The user session may be established at a certain point in time and then terminated at some later point in time. In an example, the user session may include a HTTP session, a telnet remote login session, a Session Initiation Protocol-based Internet phone call, or a Transmission Control Protocol (TCP) session. A user may interact via a user interface (e.g., an application interface) with a given application (installed in a user device) of a given service provider to perform a certain task, and such user interactions via the user interface may be captured as usage information. As each of the plurality of different service providers has different applications, thus users interacting with such different applications, for example, in terms of a number of clicks, swipes, wipes, and the like, may have different digital user experiences. The digital user experiences can be evaluated based on the usage information for a given journey. The journey refers to a path a user may take to reach their objective when using a particular user interface. The journey includes a sequence of events or experiences a user might encounter while using a product or service, and there may be different ways to enable the user to achieve their objective as quickly, efficiently, and easily as possible. Beneficially, by virtue of accurately capturing data in the form of the usage information of a plurality of different applications of the plurality of different service providers, the downstream processing of such usage information becomes accurate and reliable.

According to an embodiment, the usage information acquired for each of the plurality of different applications in the given journey includes two or more of a total time spent from a starting point to an end point of the given journey, a number of data fields populated in the given journey, a type of user input provided in the given journey, a number of swipes made in the given journey, a number of wipes made in the given journey, a number of clicks made in the given journey, a number of selections made in the given journey, and a number of screens encountered in the given journey. In other words, the total time spent may be a time period captured from identifying a click on an application icon to a journey completion. The number of data fields populated may be captured as "No. of Fields". The type of user input refers to the identification of methods of user inputs (e.g., free form, multi-choice, calendar, and the like). The number of swipes refers to the identification of a number of left-to-right or right-to-left navigational movements. The number of wipes refers to the identification of a number of scrolling up and down screens in the given journey. The number of clicks made in the given journey refers to the identification of the number of navigational clicks or selections in the journey. The number of screens encountered in the given journey refers to the identification of the number of screens encountered, including menus as a screen. Thus, different applications related to different service providers that belong to a common service of a specific industry or sector may be electronically and automatically evaluated with improved accuracy. For example, in the banking sector, different user interfaces of different banks may be evaluated in an example. In another example, in the electric vehicle industry, different user interfaces of different EV manufacturers may be evaluated.

According to an embodiment, the usage information acquired for each of the plurality of different applications in the given journey further includes a frequency of security checks in the given journey and a type of a given security check in the given journey. In an example, based on the frequency and type of security checks in the given journey, the digital user experience may change. Examples of security check may include biometric checks, username checks, numeric password check, email magic link checks, one-time passwords (OTP), and the like. The security checks like biometric may take less time compared to OTP-based security checks, which may take a longer time.

The server 104 is further configured to analyze the usage information to determine a set of scores for each of the plurality of different applications. Each score of the set of scores is determined for each of the plurality of user interactions in a given journey of accessing a corresponding application. The analysis of the usage information further comprises detecting and discarding a portion of the usage information for one or more first user interfaces of each application that do not require any user input. The scores may be predefined for different types of user inputs in the user interactions. In an example, scores are predefined for clicks, swipes, wipes, and the like. Further, the user interactions provide a number of user inputs, for example, a number of clicks or numbers of swipes. Based on the predefined values and the user interactions, the server 104 is configured to determine the set of scores for each of the applications. Further, for user interfaces that do not require user input, the usage information may be discarded, i.e., the score may not be used by the server 104. Advantageously, based on experimentation, it is observed that including all user interactions to evaluate digital user experience for the given journey may provide erroneous data in terms of digital user experience evaluation, whereas intelligently discarding certain user interactions, such as detecting and discarding a portion of usage information for one or more first user interfaces of each application that do not require any user input, results in improved accuracy in evaluation of digital user experience for each of the plurality of different applications.

According to an embodiment, the analysis of the usage information to determine the set of scores for each of the plurality of different applications further comprises assigning a different score based on the type of the given security check in the given journey. In an example, the score for a security check that is known to a user is lesser compared to the score for a security check that is unknown to a user. In an example, a security check that defines 'something you are' (e.g., biometrics) may be assigned a score of 0.5, a security check that defines 'something you know' (e.g., device PIN or passcode) may be assigned a score of 1, a security check that defines 'something you have but cannot be memorized or something you can receive' (e.g., an OTP) may be assigned a score of 2.

According to an embodiment, the analysis of the usage information to determine the set of scores for each of the plurality of different applications further comprises determining a type of journey of the given journey from a plurality of defined journeys, where the type of journey is determined based on a sequence of user interactions from a start point to an end point of the given journey in the user session. Beneficially, the set of scores may be determined based on a type of journey to enable the determination of friction score in real-time in comparison to computation after completion of the user session. This may save processing time. Further, the user may be provided with a present friction score based on the current stage of the user session.

According to an embodiment, the analysis of the usage information to determine the set of scores for each of the plurality of different applications further comprises detecting and discarding native device inputs as a part of the usage information, where the native device inputs are user interactions during the user session independent of the plurality of user interfaces of each application. This is done to determine the friction score of the user session in an efficient, reliable, and impartial manner. Certain specific parameters are determined before determining the friction score of the user session. These specific parameters may include but are not limited to: biometric security is pre-enabled where available, screens that require no input are not counted as score and friction, screens outside the app (e.g., mail) are counted as one screen, if a click acts as data input and navigate then it has been counted only once, optional inputs are not populated, pre-populated data fields are not counted if updating the data field is not required, quick access (PIN/biometrics) enabled if available while registering a new device if a payee cannot be added independently of a payment journey then the payee is added as part of a future dated payment or where future dated payments can't be made they are added as part of an immediate payment. Advantageously, based on experimentation, it is observed that including all user interactions to evaluate digital user experience for the given journey may provide erroneous data in terms of digital user experience evaluation, whereas intelligently discarding certain user interactions, such as detecting and discarding a portion of usage information based on the aforementioned specific parameters as guiding principles further significantly improves the reliability, accuracy, and simplifies the evaluation of digital user experience for each of the plurality of different applications.

According to an embodiment, each score of the set of scores for a given interaction is determined based on a type of given interaction of the plurality of user interactions. In an example, a certain type of given interaction may be assigned a relatively higher or lower score, which may depend upon the preferences of the user.

In an example, a score of "1" may be assigned for "1" field populated through the given journey. Similarly, a score of "1" may be assigned to each identified swipe, wipe, click, and screen, and a security score in the given journey. The usage information of captured time and input method may not be included in the composite score. The security score may range from 0.5 to 2 depending on the type of security identified. For example, a security check that defines 'something you are' (e.g., biometrics) may be assigned a score of 0.5, a security check that defines 'something you know' (e.g., device PIN or passcode) may be assigned a score of 1, a security check that defines 'something you have but cannot be memorized or something you can receive' (e.g., an OTP) may be assigned a score of 2. Thus, the friction score may be a sum total of the set of scores for the number of fields, swipes, wipes, clicks, screens, and the security score.

The server 104 is further configured to determine a friction score for the given journey for each of the plurality of different applications associated with the common service based on the determined set of scores. Each determined friction score is indicative of a corresponding digital user experience for the given journey for each of the plurality of different applications. In an example, the friction score may be determined based on a weighted average of the determined set of scores. In another example, the friction score may be determined based on a defined rule using the determined set of scores as input. For example, the friction score may be a total friction score, which is a sum of the determined set of scores. The friction score is determined from the set of scores for a given service in a similar way for all the different applications.

According to an embodiment, the friction score for the given journey for each application is a summation of the set of scores for said application of the plurality of different applications. Thus, based on the friction score for each application of different service providers from the plurality of user devices 106A to 106N, new users or existing users can choose to use the suitable application. Beneficially, time may be saved in crucial circumstances, for example, during controlling of a robot during a medical operation.

According to an embodiment, an order of friction scores from the lowest friction score to the highest friction score indicates an inverted order of the digital user experience for the given journey for each application of the plurality of different applications. In an example, a higher friction score corresponding to high friction in the user session indicates a lower digital user experience, and a lower friction score corresponding to low friction in user session indicates a higher digital user experience. Beneficially, for crucial circumstances, for example, while providing inputs via a user interface for autonomous vehicles, a lower friction score, i.e., higher digital user experience, is suitable and may avoid accidents. Similarly, for the banking sector, given a choice of 100 banks to choose from, knowing that an application of Bank "X" is best in terms of digital user experience as it has the lowest friction score may aid a consumer (a user) in the selection of the bank for its services.

According to an embodiment, the server 104 is further configured to compare the determined friction score of one application with friction scores of other applications of the plurality of different applications associated with the common service. The server 104 is further configured to compare the determined friction scores to enable providing the users with the ranking of the plurality of different applications of the plurality of different service providers. In other words, such a comparison of similar services offered by the different service providers within a given sector enables a user to objectively quantify and assess the ease of use and accessibility of services provided by different service providers. As a result, the user may be supplied with information that enables the user to make an informed decision. Additionally, this also assists the service providers in identifying areas of improvement and enables them to identify areas of customer dissatisfaction and ways to improve the overall customer experience in a cost-effective manner.

The server 104 is further configured to generate a first visual representation that comprises the plurality of user interactions, the determined set of scores corresponding to the plurality of user interactions, and the determined friction score for the given journey for each of the plurality of different applications. Thus, by virtue of the first visual representation, the user can identify friction areas (i.e., time-consuming areas) in the user interactions. In an example, the first visual representation may be generated after the completion of the user session.

The server 104 is further configured to control display of the generated first visual representation such that a ranking of the plurality of different applications of the plurality of different service providers associated with the common service is indicated in accordance with the determined friction score for the given journey for each of the plurality of different applications. By virtue of the control display ranking of the plurality of different applications of the plurality of different service providers, the users such as new users or existing users can be provided with information about different applications without using the different applications. Thus, the system 102 enables saving time of users, which is very crucial in critical circumstances. Such a ranking of different applications enables a user to objectively quantify and assess the ease of use and accessibility of services provided by different service providers. In other words, such ranking enables the users to make an informed decision and further enables a service provider to precisely identify specific paths or elements in the path of the journey where improvement can be done.

In some exemplary implementations, the server 104 is further configured to automatically generate a second visual representation that comprises one or more recommendations for specific user interface components for remediation to lower the friction score for one or more applications of the plurality of different applications that are above a threshold. Thus, based on the second visual representation, the service providers may identify the root cause of high friction score and thus rectify friction elements until a lower friction score is achieved, thus saving significant amount of testing time and developer's time. By virtue of a threshold value of friction score, a suitable set of applications may be provided as recommendation on the second visual representation.

According to an embodiment, the user session is associated to one or more journeys. In case of a banking sector, the one or more journeys including the given journey is at least one of: registering a new user, registering a new user device, viewing one or more transactions, adding a payee, making a payment, locking a debit card, changing an email address, applying for a new credit card, placing an order, order tracking, and product feedback. In the case of an autonomous vehicle or electric vehicle operating the user interface, one or more journeys, including the given journey, are registering a new user, registering a new user device, viewing one or more travel paths, making a payment to buy a service along the travel path, checking battery health, adjusting in-vehicle devices, switching to autonomous mode, sending a vehicle-to-vehicle communication, and the like.

Figure 1B:
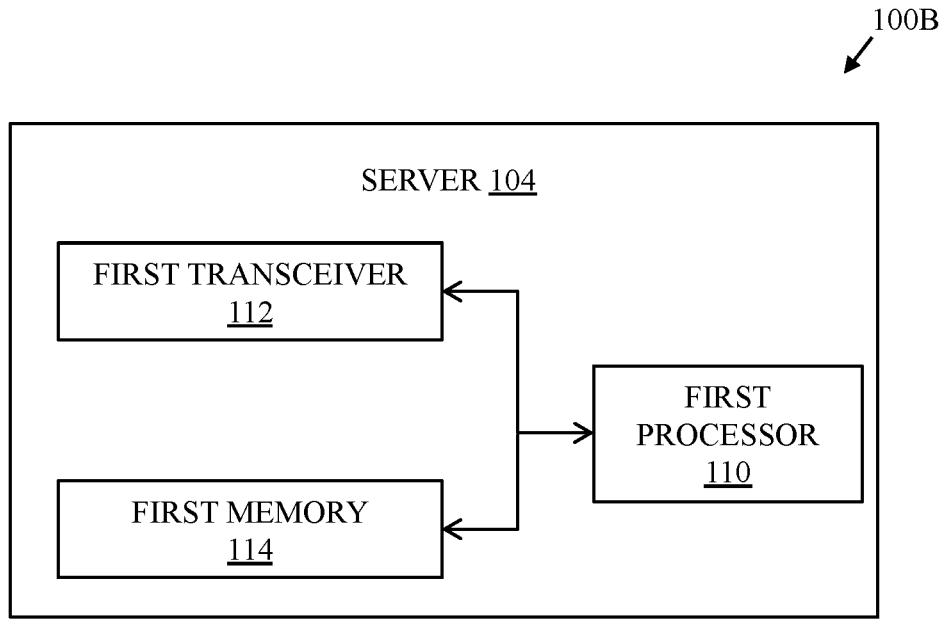
FIG. 1B is a block diagram that illustrates various exemplary components of a server for evaluating a digital user experience in a user session, in accordance with an embodiment of the present disclosure.

FIG. 1B is a block diagram that illustrates various exemplary components of a server for evaluating a digital user experience in a user session, in accordance with an embodiment of the present disclosure. FIG. 1B is explained in conjunction with elements from FIG. 1A. With reference to FIG. 1B, there is shown the server 104. The server 104 includes a first processor 110, a first transceiver 112, and a first memory 114. The first processor 110 may be communicatively coupled to the first transceiver 112 and the first memory 114. The server 104 is coupled to the plurality of user devices 106A to 106N via the communication network 108 (of FIG. 1A).

The first processor 110 is configured to receive the data from the plurality of user devices 106A to 106N. In an implementation, the first processor 110 is configured to execute instructions stored in the first memory 114. Examples of the first processor 110 may include, but is not limited to a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or control circuitry.

The first transceiver 112 includes suitable logic, circuitry, and interfaces that may be configured to communicate with one or more external devices, such as the plurality of user devices 106A to 106N. Examples of the first transceiver 112 may include, but is not limited to, an antenna, a telematics unit, a radio frequency (RF) transceiver, one or more amplifiers, one or more oscillators, a digital signal processor, a coder-decoder (CODEC) chipset, and/or a subscriber identity module (SIM) card.

The first memory 114 refers to a primary storage of the server 104. The first memory 114 includes suitable logic, circuitry, and interfaces that may be configured to store the usage information received from the user devices, such as user devices 106A to 106N and the instructions executable by the first processor 110. Examples of implementation of the first memory 114 may include, but are not limited to, Electrically Erasable Programmable Read-Only Memory (EEPROM), Read Only Memory (ROM), Hard Disk Drive (HDD), Solid-State Drive (SSD), and/or CPU cache memory. In operation, the first processor 110 is configured to perform all the operations of the server 104. For example, the first processor 110 is configured to acquire usage information, analyze usage information to determine a set of scores, determine the friction score, generate the first visual representation and control display of the generated first visual representation.

Figure 1C:
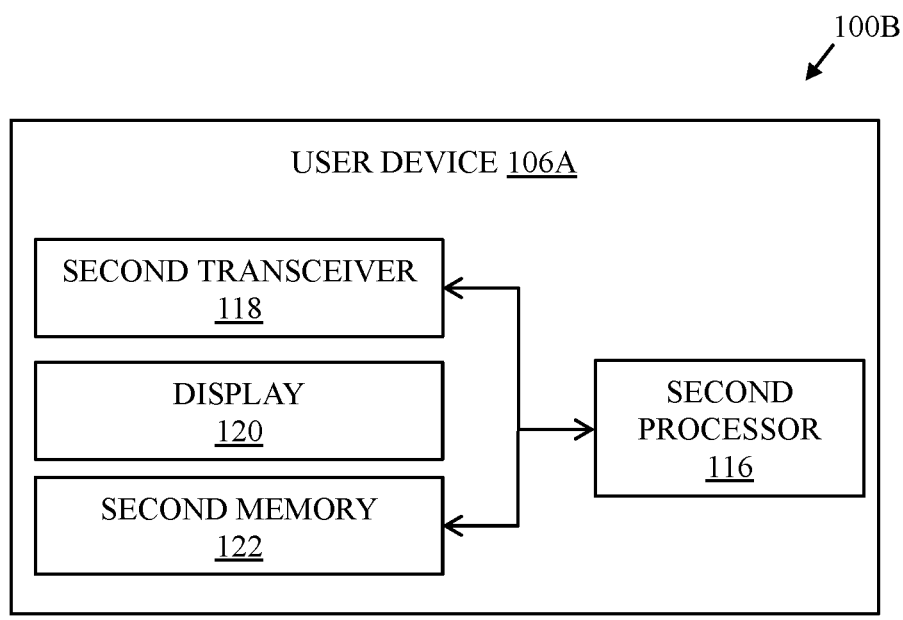
FIG. 1C is a block diagram that illustrates various exemplary components of a user device, in accordance with an embodiment of the present disclosure.

FIG. 1C is a block diagram that illustrates various exemplary components of a user device, in accordance with an embodiment of the present disclosure. FIG. 1C is explained in conjunction with elements from FIGS. 1A and 1B. With reference to FIG. 1C, there is shown the user device 106A. The user device 106A includes a second processor 116, a second transceiver 118, a display 120, and a second memory 122. The user device 106A is coupled to the server 104 via the communication network 108 (of FIG. 1A). Other user devices of the plurality of user devices 106A, 106B, . . . , 106N may be similar to that of the user device 106A.

The second processor 116 is configured to render a user interface (of an application installed in the user device 106A) on the display 120 to receive user interactions. In an implementation, the second processor 116 is configured to execute instructions stored in the second memory 122. Examples of the second processor 116 may include but are not limited to a microprocessor, a microcontroller, a complex instruction set computing (CISC) processor, an application-specific integrated circuit (ASIC) processor, a reduced instruction set (RISC) processor, a very long instruction word (VLIW) processor, a central processing unit (CPU), a state machine, a data processing unit, and other processors or control circuitry.

The second transceiver 118 includes suitable logic, circuitry, and interfaces that may be configured to communicate with one or more external devices, such as the server 104. Examples of the second transceiver 118 may include, but is not limited to, an antenna, a telematics unit, a radio frequency (RF) transceiver, one or more amplifiers, one or more oscillators, a digital signal processor, a coder-decoder (CODEC) chipset, and/or a subscriber identity module (SIM) card.

The display 120 includes suitable logic, circuitry, and interfaces that may be configured to display the generated first visual representation such that a ranking of the plurality of different applications of a plurality of different service providers is displayed. Further, the display 120 comprises displaying a second visual representation that comprises one or more recommendations for a specific user interface.

The second memory 122 refers to a primary storage of the user device 106A. The second memory 122 includes suitable logic, circuitry, and interfaces that may be configured to store the data for executing the application of the service provider. Examples of implementation of the second memory 122 may include, but are not limited to, Electrically Erasable Programmable Read-Only Memory (EEPROM), Read Only Memory (ROM), Hard Disk Drive (HDD), Solid-State Drive (SSD), and/or CPU cache memory.

Figure 2A:
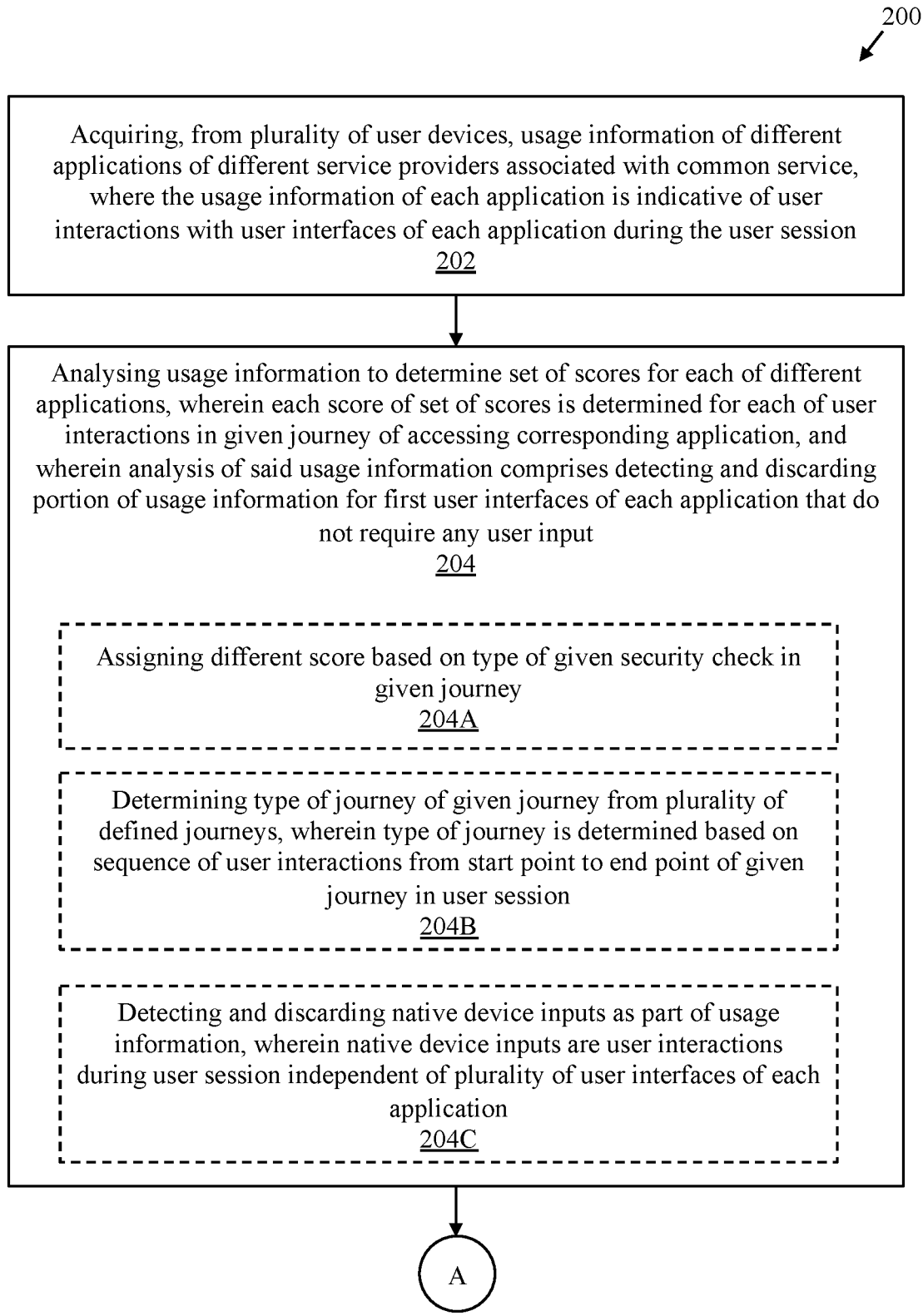
FIGS. 2A and 2B, collectively, is a flowchart of a method for evaluating a digital user experience in a user session, in accordance with an embodiment of the present disclosure.
Figure 2B:
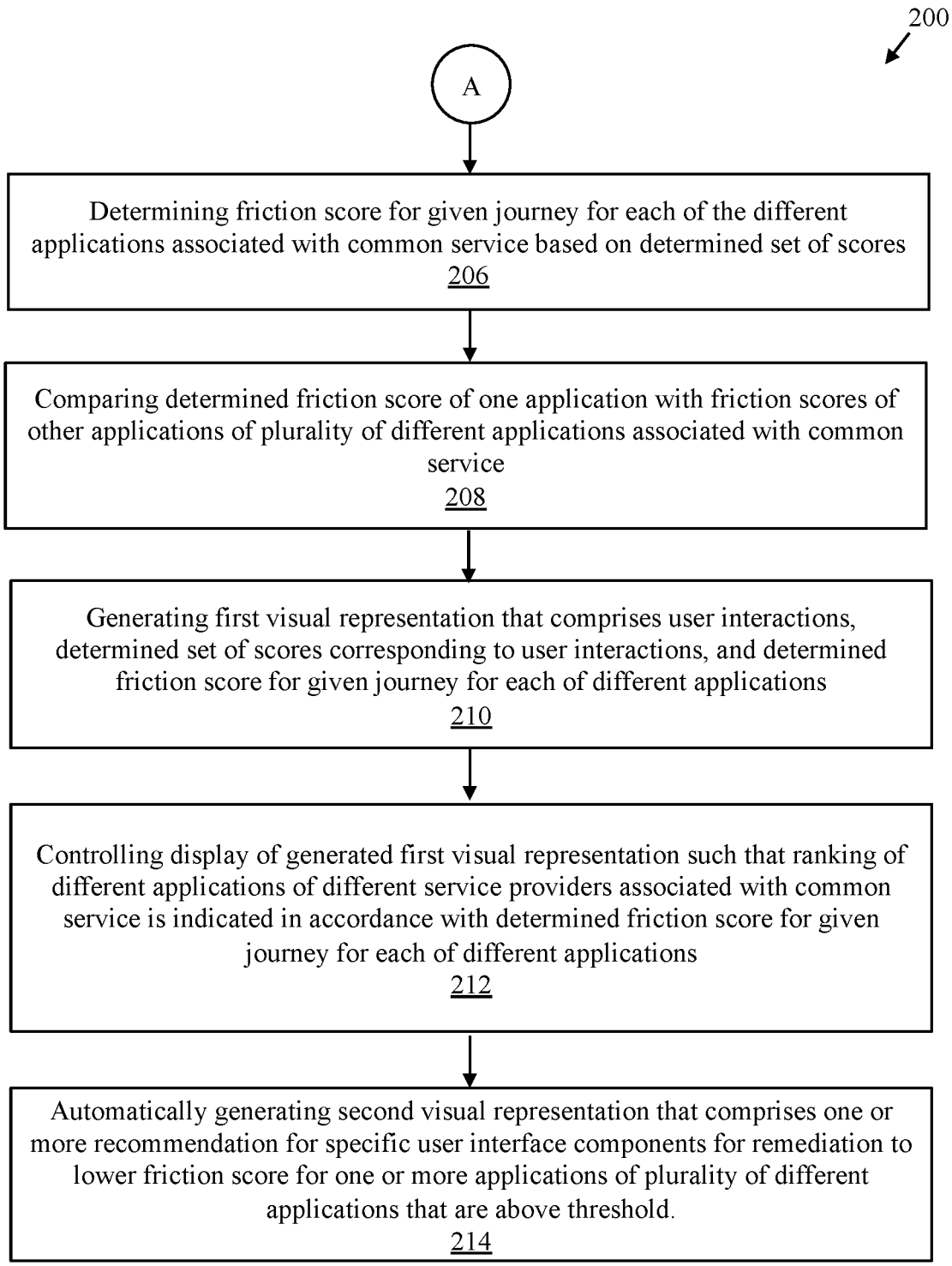

FIGS. 2A and 2B, collectively, is a flowchart of a method for evaluating a digital user experience in a user session, in accordance with an embodiment of the present disclosure. FIGS. 2A and 2B are explained in conjunction with elements from FIGS. 1A, 1B, and 1C. With reference FIGS. 2A and 2B, there is shown a flowchart of a method 200. The method 200 is executed at the server 104 (of FIG. 1A). The method 200 may include operations 202 to 214.

At 202, the method 200 comprises acquiring, from the plurality of user devices 106A to 106N, usage information of a plurality of different applications of a plurality of different service providers associated with a common service, wherein the usage information of each application is indicative of a plurality of user interactions with a plurality of user interfaces of each application during the user session. In an example, a user may interact via the user interface with a given application of a given service provider. According to an embodiment, the usage information acquired for each of the plurality of different applications in the given journey includes a total time spent from a starting point to an end point of the given journey, a number of data fields populated in the given journey, a type of user input provided in the given journey, a number of swipes made in the given journey, a number of wipes made in the given journey, a number of clicks made in the given journey, a number of selections made in the given journey, and a number of screens encountered in the given journey. The usage information acquired for each of the plurality of different applications in the given journey further includes a frequency of security checks in the given journey and a type of a given security check in the given journey. In an example, based on the frequency and type of security checks in the given journey, the digital user experience may change. In an example, the user session is associated to one or more journeys.

At 204, the method 200 further comprises analyzing the usage information to determine a set of scores for each of the plurality of different applications, where each score of the set of scores is determined for each of the plurality of user interactions in a given journey of accessing a corresponding application. The analysis of the usage information comprises detecting and discarding a portion of the usage information for one or more first user interfaces of each application that do not require any user input. Thus, for user interfaces that do not require user input, the usage information may be discarded i.e., the score may not be used by the method 200. The operation 204 may include one or more sub-steps or sub-operations, such as operations 204A, 204B, and 204C.

At 204A, the analyzing of the usage information to determine the set of scores for each of the plurality of different applications further comprises assigning a different score based on the type of the given security check in the given journey. In an example, the score for a security check that is known to a user is lesser compared to the score for a security check that is unknown to a user. In an example, security check that is known to the user (e.g., biometrics) may have a score of 0.5, device PIN, the passcode may have a score of 1, security check that is unknown/cannot be memorized or is received by a user at a given time (e.g., OTP, Net guard code such as BNZ) may have a score of 2.

At 204B, the analyzing of the usage information to determine the set of scores for each of the plurality of different applications further comprises determining a type of journey of the given journey from a plurality of defined journeys, where the type of journey is determined based on a sequence of user interactions from a start point to an end point of the given journey in the user session. Beneficially, the set of scores may be determined based on a type of journey enabling determination of scores or friction score in real-time in comparison to computation after completion of the user session. This may save processing time. Further, the user may be provided with a present friction score based on the current stage of the user session.

At 204C, the analyzing of the usage information to determine the set of scores for each of the plurality of different applications further comprises detecting and discarding native device inputs as a part of the usage information. The native device inputs are user interactions during the user session independent of the plurality of user interfaces of each application. This is done to determine the friction score of the user session in an efficient and impartial manner. Certain specific parameters are determined before determining the friction score of the user session, as described in FIG. 1A. According to an embodiment, each score of the set of scores for a given interaction is determined based on a type of given interaction of the plurality of user interactions. In an example, a certain type of given interaction may be assigned a relatively higher or lower score, which may depend upon the preferences of the user.

At 206, the method 200 further comprises determining a friction score for the given journey for each of the plurality of different applications associated with the common service based on the determined set of scores. Each determined friction score is indicative of a corresponding digital user experience for the given journey for each of the plurality of different applications. In an example, the friction score may be determined based on a weighted average of the determined set of scores. In an implementation, the friction score for the given journey for each application is a summation of the set of scores for said application of the plurality of different applications. Thus, based on the friction score for each application of different service providers from the plurality of user devices 106A to 106N, new users or existing users can choose to use the suitable application. According to an embodiment, an order of friction scores from the lowest friction score to the highest friction score indicates an inverted order of the digital user experience for the given journey for each application of the plurality of different applications. In an example, a higher friction score corresponding to high friction in a user session indicates a lower digital user experience, and a lower friction score corresponding to low friction in the user session indicates an enhanced digital user experience.

At 208, the method 200 further comprises comparing the determined friction score of one application with friction scores of other applications of the plurality of different applications associated with the common service. The comparison of the determined friction scores enables providing the users with the ranking of the plurality of different applications of the plurality of different service providers. In other words, such a comparison of similar services offered by the different service providers within a given sector enables a user to objectively quantify and assess the ease of use and accessibility of services provided by different service providers. Additionally, this also assists the service providers in identifying areas of improvement and enables them to identify areas of customer dissatisfaction and ways to improve the overall customer experience in a cost-effective manner.

At 210, the method 200 further comprises generating a first visual representation that comprises the plurality of user interactions, the determined set of scores corresponding to the plurality of user interactions, and the determined friction score for the given journey for each of the plurality of different applications. Thus, by virtue of the first visual representation, the user can identify friction areas (i.e., time-consuming areas) in the user interactions. In an example, the first visual representation may be generated after the completion of the user session.

At 212, the method 200 further comprises controlling display of the generated first visual representation such that a ranking of the plurality of different applications of the plurality of different service providers associated with the common service is indicated in accordance with the determined friction score for the given journey for each of the plurality of different applications. By virtue of the control display ranking of the plurality of different applications of the plurality of different service providers, the users such as new users or existing users can be provided with information about different applications without using the different applications. Such a ranking of different applications enables a user to objectively quantify and assess the ease of use and accessibility of services provided by different service providers. In other words, such ranking enables the users to make an informed decision.

At 214, the method 200 further comprises automatically generating a second visual representation that comprises one or more recommendations for specific user interface components for remediation to lower the friction score for one or more applications of the plurality of different applications that are above a threshold. Thus, based on the second visual representation, the new or existing users may choose the application from a different service provider having a lower friction score thus, saving time for the user. By virtue of a threshold value of friction score, a suitable set of applications are provided as a recommendation on the second visual representation.

According to an embodiment, the common service corresponds to the same industry or the same sector. Thus, the present disclosure enables users to make suitable choices for applications provided by different services providers of the same industry or sector. The embodiments of the present disclosure have practical applications in some sectors and industries, where the consumers consume the services at least by using one or more user interfaces of an application. Examples of such industries may include but are not limited to robotics, autonomous vehicles, retail, insurance, public services, banking, and the like. For example, in the banking sector, the friction score of the banking applications may be determined to arrive at a conclusion as to which bank offers a better user experience in terms of online banking. The banking applications may be compared for the online services, including but not limited to logging into the app for the first time on a new device, seeing the most recent transaction, searching for all outgoing transactions less than $100 (or equivalent) in a particular month of a particular year, adding a new payment recipient (separate to the payment journey where possible), making a payment to an existing individual recipient, locking (or freezing) a debit card, changing the email address of the account holder, applying for a new credit card (up to but not including submission), etc.

FIG. 3A is an illustration of a first exemplary scenario of implementation of the system and method for evaluating a digital user experience in a user session for a banking sector, in accordance with an embodiment of the present disclosure. FIG. 3A is explained in conjunction with elements from FIGS. 1A, 1B, 1C, 2A and 2B. With reference to FIG. 3A, there is shown an exemplary visual representation 300A.

The exemplary visual representation 300A comprises usage information 304A captured and acquired from the plurality of user devices 106A to 106N (of FIG. 1A). The usage information 304A is of a plurality of different applications of the plurality of different service providers 302A to 302N associated with a banking service. There is further shown service providers country-wise, for example, USA and UK. There is shown corresponding scores for each type of usage information that is captured, such as a number of fields 304C, swipes 304D, wipes 304E, clicks 304F, screens 304G, security 304H. There is further shown a total friction score 304I and a rank 304J of the plurality of different applications of the plurality of different service providers 302A to 302N.

In the first exemplary scenario, the usage information 304A may be captured and acquired for a journey, such as a journey of registering a device executed by accessing a corresponding application of a service provider. The registering of a device refers to logging into a given application for the first time on a new device.

The usage information 304A, such as a number of fields 304C, swipes 304D, wipes 304E, clicks 304F, screens 304G, security 304H of the plurality of different applications of the plurality of different service providers 302A to 302N is received from the plurality of user devices, such as user devices 106A to 106N by the server 104. The server 104 further analyses the usage information such as a number of fields 304C, swipes 304D, wipes 304E, clicks 304F, screens 304G, security 304H by determining scores for each of a plurality of different applications. The aforesaid scores are shown in the exemplary visual representation 300A. The server 104 further determines the total friction score 304I (i.e., the friction score) by adding all the aforesaid individual scores. The server 104 further provides a controlled display of ranks 304J of the plurality of different applications of the plurality of different service providers based on the total friction score 304I.

The time 304B refers to amount of time spent in user session (i.e., time from clicking on an application icon to journey completion), number of fields 304C refers to fields that require user input for registering the new device (i.e., identification of number of data fields populated through the journey), swipes 304D refers to number of swipes executed to register the new device (i.e., identification of number of left to right or right to left navigational movements), wipes 304E refers to number of wipes executed to register the new device (i.e., identification of number of scrolling up and down screens in journey), clicks 304F refers to number of clicks executed to provide inputs for registering new device (i.e., identification of the number of navigational clicks or selections in the journey), screens 304G refers to number of screens encountered by user in user session for registering the new device (i.e., identification of the number of screens encountered, including menus as a screen), security 304H refers to number of security in user session for registering the new user device (i.e., identification of type and frequency of security in journey), total friction score 304I refers to the friction score (i.e., sum total of the scores for the number of fields, swipes, wipes, clicks, screens and the security score) and rank 304J refers to ranking of different service providers based on the value of total friction score 304I.

In this exemplary scenario, for the first service provider 302A of the United States of America (USA), the time 304B (i.e., the time of completion of journey) is 0 minutes 25 seconds. Further, a score of number of fields 304C is 3, swipes 304D is 0, wipes 304E is 0, clicks 304F is 4, screens 304G is 6, security 304H is 4, total friction score 304I is 17, and rank 304J is 3. For the second service provider 302B of the USA, the time 304B is 1 minute 27 seconds. Further, the score of the number of fields 304C is 2, swipes 304D is 0, wipes 304E is 0, clicks 304F is 6, screens 304G is 5, security 304H is 2, total friction score 304I is 15, and rank 304J is 2. Similarly, for the third service provider 302C of the USA, the time 304B is 0 minute 49 seconds. Further, the score of the number of fields 304C is 2, swipes 304D is 0, wipes 304E is 0, clicks 304F is 4, screens 304G is 3, security 304H is 2.5, total friction score 304I is 11.5, and rank 304J is 1. Finally, for the Nth service provider 302N of the United Kingdom (UK), the time 304B is 1 minute 52 seconds. Further, the score of the number of fields 304C is 2, swipes 304D is 0, wipes 304E is 0, clicks 304F is 9, screens 304G is 8, security 304H is 4.5, total friction score 304I is 23.5, and rank 304J is N. Thus, the application of the third service provider 302C has the lowest total friction score 11.5, which indicates that the application of the third service provider 302C provides enhanced digital user experience as compared to other applications of other service providers.

FIG. 3B is an illustration of a second exemplary scenario of implementation of the system and method for evaluating a digital user experience in a user session for a banking sector, in accordance with an embodiment of the present disclosure. FIG. 3B is explained in conjunction with elements from FIGS. 1A, 1B, 1C, 2A, 2B, and 3A. With reference to FIG. 3B, there is shown an exemplary visual representation 300B. The exemplary visual representation 300B comprises scores of usage information 304A of the plurality of different applications of the plurality of different service providers 302A to 302N. The second exemplary scenario refers to another experimentation conducted after the first exemplary scenario of FIG. 3B for the same applications and service providers but for another journey, such as viewing the last transaction executed by accessing a corresponding application, to evaluate a user experience for different applications for another journey. The viewing last transaction refers to seeing the most recent transaction.

The time 304B refers to the amount of time spent in user session (i.e., time from clicking on an application icon to journey completion), the number of fields 304C refers to fields that require user input for viewing the last transaction, swipes 304D refers to the number of swipes executed to view the last transaction, wipes 304E refers to the number of wipes executed to view the last transaction, clicks 304F refers to the number of clicks executed to provide inputs for viewing last transaction, screens 304G refers to the number of screens encountered by user in user session for viewing the last transaction, security 304H refers to the number of security in user session for viewing the last transaction, total friction score 304I refers to the friction score (i.e., the sum total of the scores for the number of fields, swipes, wipes, clicks, screens, and the security score) and rank 304J refers to the ranking of different service providers based on the value of total friction score 304I.

In this example, for the first service provider 302A that belongs to the USA, the time 304B (i.e., time for journey completion) is 0 minutes 3 seconds. Further, the score for the number of fields 304C is 0, swipes 304D is 0, wipes 304E is 0, clicks 304F is 1, screens 304G is 2, security 304H is 0.5, and thus the total friction score 304I is 3.5 and rank 304J is 1. For the second service provider 302B that also belongs to the USA, the time 304B is 0 minutes 14 seconds. Further, the score of the number of fields 304C is 0, swipes 304D is 0, wipes 304E is 0, clicks 304F is 2, screens 304G is 3, security 304H is 0.5, total friction score 304I is 5.5, and rank 304J is 2. For the third service provider 302C of the USA, the time 304B is 0 minute 11 seconds. Further, the score of the number of fields 304C is 0, swipes 304D is 0, wipes 304E is 0, clicks 304F is 2, screens 304G is 3, security 304H is 0.5, total friction score 304I is 5.5, and rank 304J is 2. Similarly, for the Nth service provider 302N of the UK, the time 304B is 0 minutes 17 seconds. Further, the score of the number of fields 304C is 0, swipes 304D is 0, wipes 304E is 0, clicks 304F is 3, screens 304G is 3, security 304H is 0.5, total friction score 304I is 6.5, and rank 304J is N. Thus, the display is controlled to show the application that belongs to the first service provider 302A having the lowest total friction score 304I of 3.5 is ranked highest (i.e., rank 304J is 1) first followed by next ranked applications.

FIG. 3C is an illustration of a third exemplary scenario of implementation of the system and method for evaluating a digital user experience in a user session for a banking sector, in accordance with an embodiment of the present disclosure. FIG. 3C is explained in conjunction with elements from FIGS. 1A, 1B, 1C, 2A, 2B, 3A, and 3B. With reference to FIG. 3C, there is shown an exemplary visual representation 300C. The exemplary visual representation 300C comprises scores of journeys 306A of the plurality of different applications of the plurality of different service providers 302A to 302N associated with the common service (banking sector in this example). There is shown the corresponding country of the plurality of different service providers 302A to 302N. There is further shown total friction scores 304I or friction scores of different journeys, i.e., journeys 306A, such as a register device 306B, view the last transaction 306C, transaction search 306D, add payee 306E, make payment 306F, lock debit card 306G, apply credit card 306H. There is further shown average 306I and rank 306J. The total friction scores of two different journeys, such as a register device, as shown in FIG. 3A, view the last transaction as shown in FIG. 3B, are used in FIG. 3C. Similarly, the total friction score of other journeys, such as transaction search 306D, add payee 306E, make payment 306F, lock debit card 306G, apply credit card 306H, are further determined and shown in FIG. 3C, in order to evaluate the digital user experience comprehensively and accurately with regards to usage of corresponding application of a service provider.

The friction scores of different journeys, such as the journeys 306A, are used by the server 104 to determine the average 306I by determining an average of all the friction scores. The server 104 further displays rank 306J of the plurality of different applications of the plurality of different service providers based on the average 306I.

In this exemplary scenario, there is shown scores for different service providers corresponding to the application. The register device 306B refers to registering a device for executing banking services (i.e., logging into an application for the first time on a new device), view last transaction 306C refers to viewing last financial transaction executed by a user (i.e., seeing the most recent transaction), transaction search 306D refers to viewing history of transaction searches (i.e., searching for all outgoing transactions less than $100 (or equivalent)), add payee 306E refers to adding a payee for transferring financial resource (i.e., adding a new payment recipient separate to payment journey where possible), make payment 306F refers to executing payment to a given payee (i.e., making a payment to an existing individual recipient), lock debit card 306G refers to locking/disabling a debit card (i.e., locking (or freezing) a debit card), apply credit card 306H refers to applying for a credit card (i.e., applying for a new credit card (up to but not including submission)), average 306I may also be referred to as average of the aforesaid scores and rank 306J refers to ranking of different service providers based on the value of average 306I.

In this exemplary scenario, for the application of the first service provider 302A, the friction score of register device 306B is 17, friction score of view last transaction 306C is 8.5, friction score of transaction search 306D is Not Any (NA), friction score of add payee 306E is 14.5, friction score of make payment 306F is 13.5, friction score of lock debit card 306G is 7.5, friction score of apply credit card 306H is NA, the score of average 306I is 13.2 and rank 306J is 1, which indicates the best application in terms of digital user experience as compared to other application of other service providers.

Similarly, for the application of the second service provider 302B, the friction score of register device 306B is 15, friction score of view last transaction 306C is 5.5, friction score of transaction search 306D is 21.5, friction score of add payee 306E is 20.5, friction score of make payment 306F is 12.5, friction score of lock debit card 306G is 9.5, friction score of apply credit card 306H is 19.5, the average 306I is 14.7 and rank 306J is 2. Similarly, for the application of the third service provider 302C, the rank is 3 ($3^{rd}$ rank).

Figure 4A:
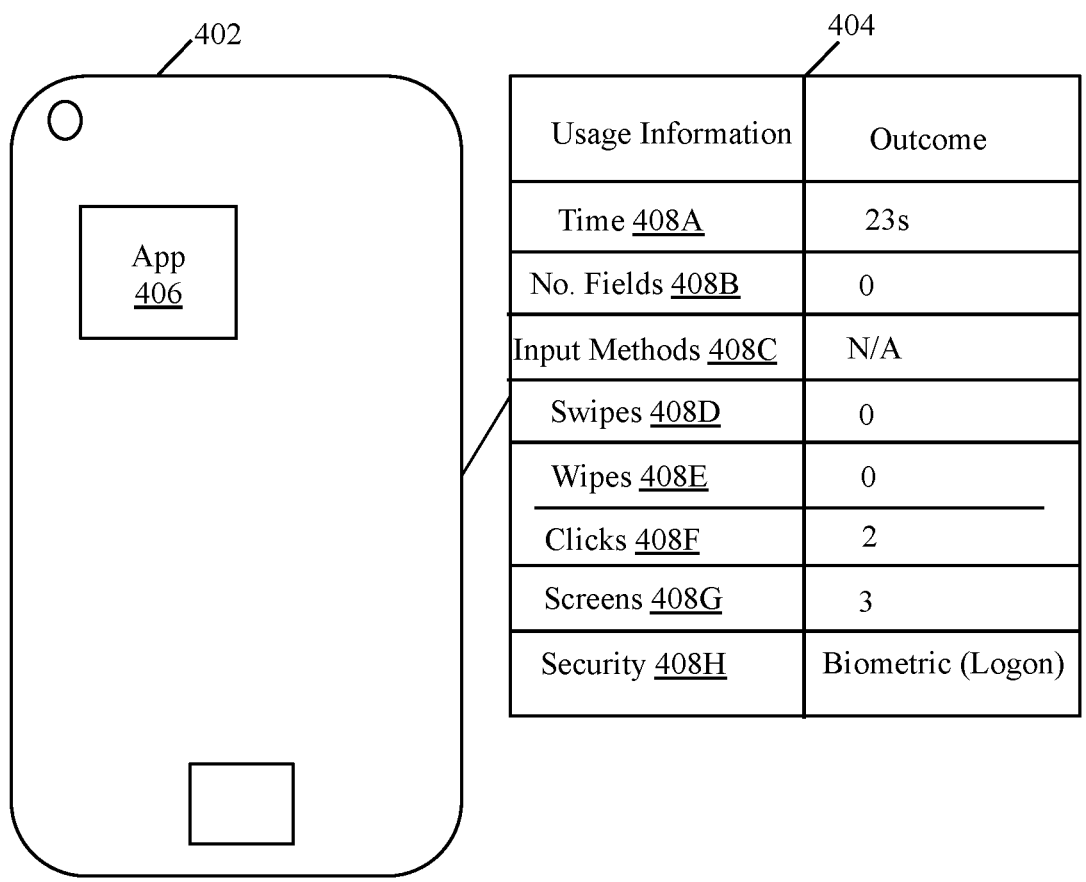
FIGS. 4A and 4B are illustrations of exemplary scenarios of implementation of the system and method for evaluating a digital user experience in a user session for a robotics sector, in accordance with an embodiment of the present disclosure.
Figure 4B:
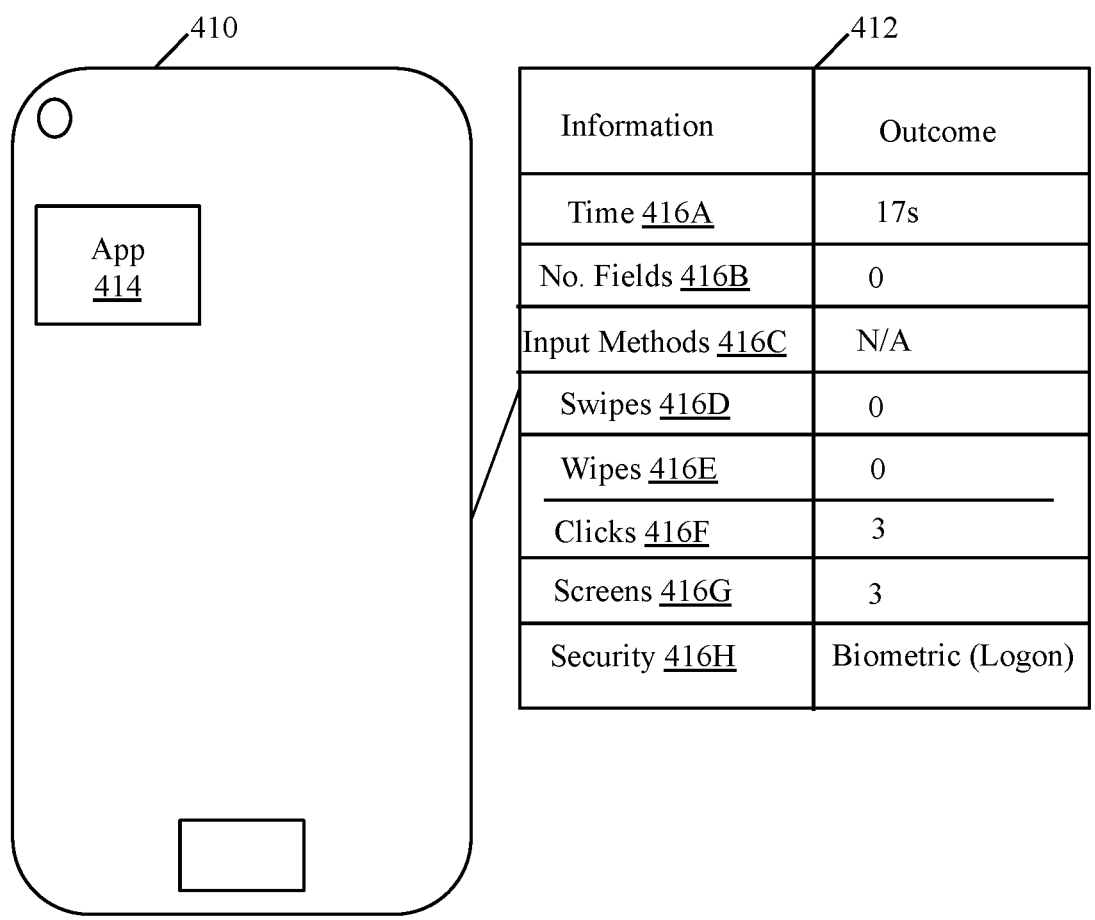

FIGS. 4A and 4B are illustrations of exemplary scenarios of implementation of the system and method for evaluating a digital user experience in a user session for a robotics sector, in accordance with another embodiment of the present disclosure. FIGS. 4A and 4B are explained in conjunction with elements from FIGS. 1A, 1B, 1C, 2A, 2B, 3A, 3B, and 3C. With reference to FIG. 4A, there is shown a first user device 402 and captured usage information 404. The first user device 402 comprises an application 406 used to control and operate a robotic device, where the robotic application is developed and provided by a first service provider. The server 104 is configured to display captured and processed usage information, such as time 408A and the usage information 404, such as a number of fields 408B, an input method 408C, swipes 408D, wipes 408E, clicks 408F, screens 408G. There is further shown a type of security 408H. The usage information 404 is communicated by the first user device 402 and processed by the server 104 to determine the set of scores for a journey, such as registering the first user device 402 in which the application 406 is installed to operate and remotely control the robotic device.

The first user device 402 receives user inputs for registering itself via the application 406. In this example, the time 408A (i.e., time of completion of the journey from a click of the application icon) is 23 seconds, the input methods 408C includes not any (NA) inputs, the security 408H identified includes biometric (log on). Similarly, the data captured for identifying usage information 404 in terms of the number of fields 408B may be 0, swipes 408D may be 0, wipes 408E may be 0, clicks 408F may be 2, and the screens 408G may be 3. This usage information 404 may be processed by the server 104 to determine the friction score for the application 406.

With reference to FIG. 4B, there is shown a second user device 410 and corresponding usage information 412. The second user device 410 comprises another application 414 provided by a second service provider that belongs to the same robotics sector. The application 414 may be used to control and operate a similar kind of robotic device as FIG. 4A, but the application 414 may be developed, designed, and provided by the second service provider. The server 104 is configured to remotely capture and process the usage information 412, such as a time 416A, a number of fields 416B, an input method 416C, swipes 416D, wipes 416E, clicks 416F, screens 416G, and a type of security 416H, for the same journey as of FIG. 4A.

Based on the corresponding usage information of the application 414 (of FIG. 4B) and the other application 406 (of FIG. 4A), the server 104 may be configured to determine friction score for the given journey (e.g., in this case, user device registration) for both the applications 406 and 414 associated with the common service that is related to operating the robotic device, where each determined friction score is indicative of a corresponding digital user experience for the given journey. Thus, a new user may easily and reliably know which application is better in terms of providing a digital user experience.

Figure 5A:
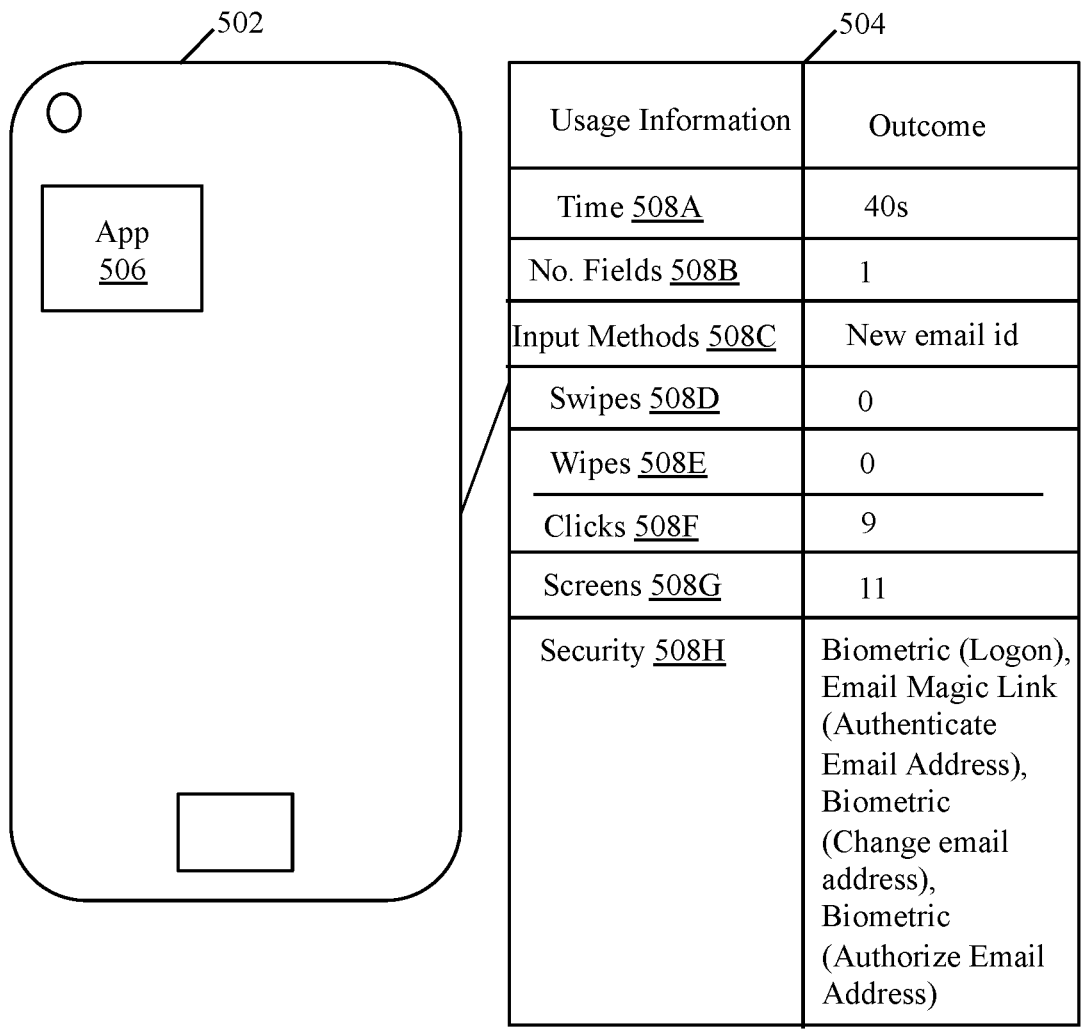
FIGS. 5A and 5B are illustrations of exemplary scenarios of implementation of the system and method for evaluating a digital user experience in a user session for an autonomous vehicle sector, in accordance with another embodiment of the present disclosure.
Figure 5B:
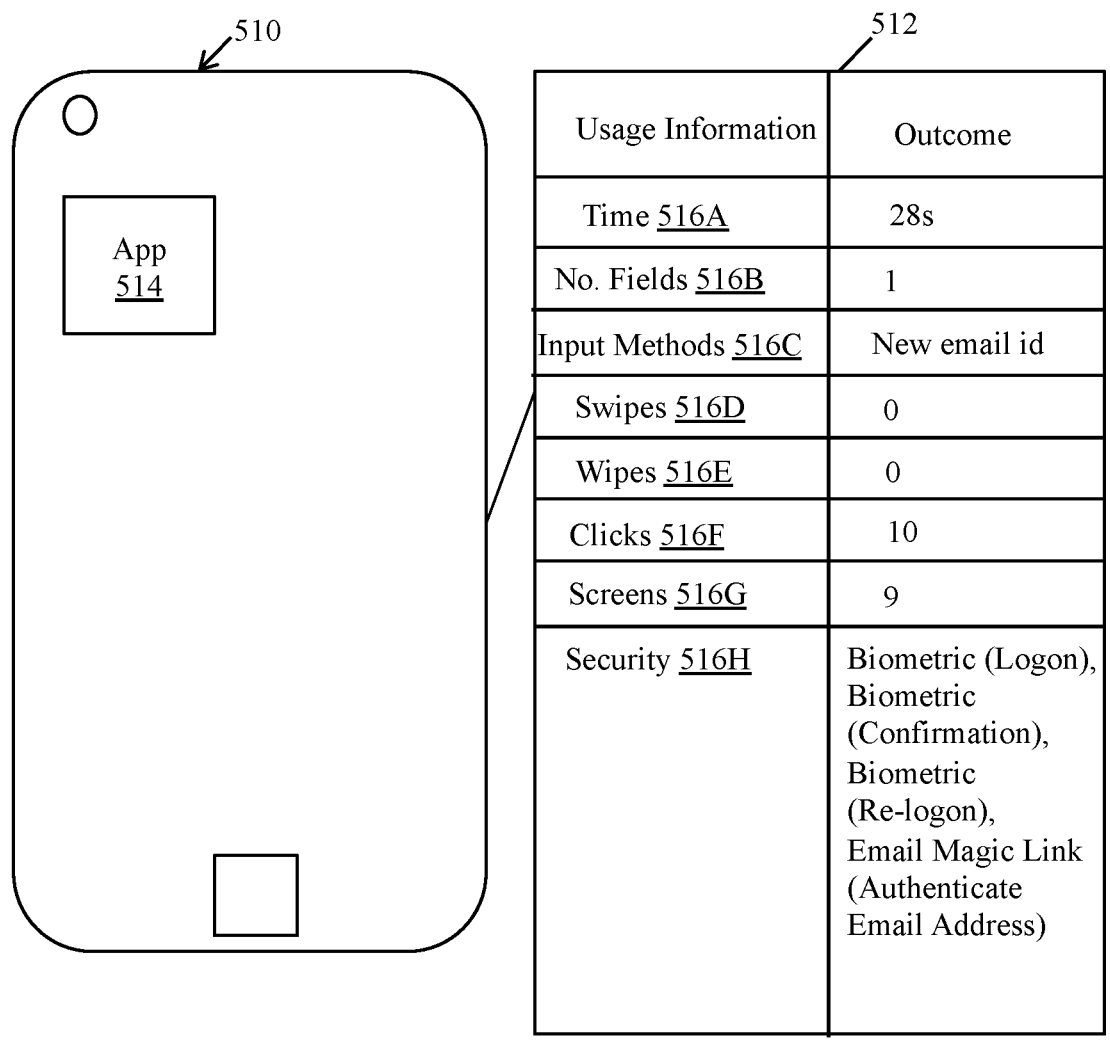

FIGS. 5A and 5B are illustrations of exemplary scenarios of implementation of the system and method for evaluating a digital user experience in a user session for an autonomous vehicle sector, in accordance with an embodiment of the present disclosure. FIGS. 5A and 5B are explained in conjunction with elements from FIGS. 1A, 1B, 1C, 2A, 2B, 3A, 3B, 3C, 4A, and 4B. With reference to FIG. 5A, there is shown a user device 502 and usage information 504 captured while performing user interactions with an autonomous vehicle application 506 installed in the user device 502. In this case, the user device 502 may be a smartphone that needs to be paired and registered with an autonomous vehicle. The autonomous vehicle application 506 may have one more user interface and may be provided by a first service provider.

In an implementation, the usage information 504 may be remotely captured and acquired by the server 104 via one or more application programming interface (API) or agents installed in the user device 502 as a part of the autonomous vehicle application 506 or as separate APIs installed later as per user-configuration. The usage information 504, for example, may include time 508A, the number of fields 408B, input methods 508C, swipes 508D, wipes 508E, clicks 458F, screens 508G, and a type of security 508H. The usage information 504 may be captured for a journey, registering the user device 502 with the autonomous vehicle.

The user device 502 receives user inputs for registering itself via the autonomous vehicle application 506. In an example, time 508A is 40 seconds, and the input methods 508C includes a new email id, the security 508H includes biometric (log on), email magic link (authenticate email address), biometric (change email address), biometric (authorize email address). The usage information 504 further includes the number of fields 508B identified as 1, the number of swipes 508D identified as 0, the number of wipes 508E identified as 0, the clicks 508F identified as 9, and the screens 508G identified as 11.

With reference to FIG. 5B, there is shown another user device 510 and usage information 512 captured while performing user interactions with an autonomous vehicle application 514 installed in the user device 510. The autonomous vehicle application 514 may be provided by a second service provider different from the first service provider of FIG. 5A. The usage information 512 may include time 516A, a number of fields 516B, an input method 516C, swipes 516D, wipes 516E, clicks 516F, screens 516G, a type of security 516H, where the usage information 512 is captured and processed for the same journey as of FIG. 5B.

The user device 510 receives user inputs for registering itself via the autonomous vehicle application 514. In an example, time 516A is 28 seconds, and the input method 516C includes a new email id, the security 516H includes biometric (log on), biometric (confirmation), biometric (re-logon), email magic link (authenticate email address). Based on the usage information of the autonomous vehicle application 514 (FIG. 5B) and the autonomous vehicle application 506 (FIG. 5A), the server 104 may be configured to determine friction score for the same journey for both the autonomous vehicle applications 506 and 514 associated with common service that is related to operating the autonomous vehicle, where each determined friction score is indicative of a corresponding digital user experience for the given journey. Thus, a new user may easily and reliably know which application is better in terms of providing a digital user experience. Moreover, any shortcomings in an application may be identified based on friction score and individual score for different captured usage information for the given journey to improve the application for said journey. Such optimization and enhancement of user experience may be very sensitive for user interfaces related to autonomous vehicles as a slight reduction or improvement in time, and user experience goes a long way in improving the handling of the autonomous vehicle.

In yet another aspect, the present disclosure further provides a non-transitory computer-readable medium having stored therein, computer-implemented instructions which when executed by a computer causes the computer to execute operations, the operations comprising acquiring, from a plurality of user devices, usage information of a plurality of different applications of a plurality of different service providers associated with a common service, wherein the usage information of each application is indicative of a plurality of user interactions with a plurality of user interfaces of each application during the user session. The operations further comprise analyzing said usage information to determine a set of scores for each of the plurality of different applications, wherein each score of the set of scores is determined for each of the plurality of user interactions in a given journey of accessing a corresponding application, and wherein the analysis of said usage information comprises detecting and discarding a portion of usage information for one or more first user interfaces of each application that do not require any user input. The operations further comprise determining a friction score for the given journey for each of the plurality of different applications associated with the common service based on the determined set of scores wherein each determined friction score is indicative of a corresponding digital user experience for the given journey for each of the plurality of different applications. The operations further comprise generating a first visual representation that comprises the plurality of user interactions, the determined set of scores corresponding to the plurality of user interactions, and the determined friction score for the given journey for each of the plurality of different applications. The operations further comprise controlling display of the generated first visual representation such that a ranking of the plurality of different applications of the plurality of different service providers associated with the common service is indicated in accordance with the determined friction score for the given journey for each of the plurality of different applications.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

The invention claimed is:

1. A system for evaluating a digital user experience in a user session, wherein the system comprises a server communicatively coupled to a memory and a plurality of user devices, wherein the server is configured to:
    Acquire, via a processor, from the plurality of user devices, usage information of a plurality of different applications of a plurality of different service providers associated with a common service, wherein the usage information of each application is indicative of a plurality of user interactions with a plurality of user interfaces of each application during the user session;
    Analyze, via a processor, said usage information to determine a set of scores for each of the plurality of different applications, wherein each score of the set of scores is determined for each of the plurality of user interactions in a given journey of accessing a corresponding application, and wherein the analysis of said usage information comprises detecting and discarding a portion of the usage information for one or more first user interfaces of each application that do not require any user input;
    Determine, via a processor, a friction score for the given journey for each of the plurality of different applications associated with the common service based on the determined set of scores, wherein each determined friction score is indicative of a corresponding digital user experience for the given journey for each of the plurality of different applications;
    Generate, via a processor, a first visual representation that comprises the plurality of user interactions, the determined set of scores corresponding to the plurality of user interactions, and the determined friction score for the given journey for each of the plurality of different applications; and
    Control, via a processor, display of the generated first visual representation such that a ranking of the plurality of different applications of the plurality of different service providers associated with the common service is indicated in accordance with the determined friction score for the given journey for each of the plurality of different applications.

2. The system of claim 1, wherein said usage information acquired for each of the plurality of different applications in the given journey includes two or more of: a total time spent from a starting point to an endpoint of the given journey, a number of data fields populated in the given journey, a type of user input provided in the given journey, a number of swipes made in the given journey, a number of wipes made in the given journey, a number of clicks made in the given journey, a number of selections made in the given journey, and a number of screens encountered in the given journey.

3. The system of claim 2, wherein said usage information acquired for each of the plurality of different applications in the given journey, further includes a frequency of security checks in the given journey and a type of a given security check in the given journey.

4. The system of claim 3, wherein the analysis of the usage information to determine the set of scores for each of the plurality of different applications, further comprises assigning a different score based on the type of the given security check in the given journey.

5. The system of claim 1, wherein the analysis of the usage information to determine the set of scores for each of the plurality of different applications further comprises determining a type of journey of the given journey from a plurality of defined journeys, wherein the type of journey is determined based on a sequence of user interactions from a start point to an endpoint of the given journey in the user session.

6. The system of claim 1, wherein the analysis of the usage information to determine the set of scores for each of the plurality of different applications, further comprises detecting and discarding native device inputs as a part of the usage information, wherein the native device inputs are user interactions during the user session independent of the plurality of user interfaces of each application.

7. The system of claim 1, wherein the friction score for the given journey for each application is a summation of the set of scores for said application of the plurality of different applications.

8. The system of claim 1, wherein an order of friction scores from the lowest friction score to the highest friction score, indicates an inverted order of the digital user experience for the given journey for each application of the plurality of different applications.

9. The system of claim 1, wherein each score of the set of scores for a given interaction is determined based on a type of given interaction of the plurality of user interactions.

10. The system of claim 1, wherein the common service corresponds to a common industry or sector.

11. The system of claim 1, wherein the server is further configured to automatically generate a second visual representation that comprises one or more recommendations for specific user interface components for remediation to lower the friction score for one or more applications of the plurality of different applications that are above a threshold.

12. The system of claim 1, wherein the server is further configured to compare the determined friction score of one application with friction scores of other applications of the plurality of different applications associated with the common service.

13. A method for evaluating a digital user experience in a user session, the method comprising:
    acquiring, from a plurality of user devices, usage information of a plurality of different applications of a plurality of different service providers associated with a common service, wherein the usage information of each application is indicative of a plurality of user interactions with a plurality of user interfaces of each application during the user session;
    analyzing said usage information to determine a set of scores for each of the plurality of different applications, wherein each score of the set of scores is determined for each of the plurality of user interactions in a given journey of accessing a corresponding application, and wherein the analysis of said usage information comprises detecting and discarding a portion of the usage information for one or more first user interfaces of each application that do not require any user input;
determining a friction score for the given journey for each of the plurality of different applications associated with the common service based on the determined set of scores wherein each determined friction score is indicative of a corresponding digital user experience for the given journey for each of the plurality of different applications;
generating a first visual representation that comprises the plurality of user interactions, the determined set of scores corresponding to the plurality of user interactions, and the determined friction score for the given journey for each of the plurality of different applications; and
controlling display of the generated first visual representation such that a ranking of the plurality of different applications of the plurality of different service providers associated with the common service is indicated in accordance with the determined friction score for the given journey for each of the plurality of different applications.

14. The method of claim 13, wherein said usage information acquired for each of the plurality of different applications in the given journey includes two or more of: a total time spent from a starting point to an endpoint of the given journey, a number of data fields populated in the given journey, a type of user input provided in the given journey, a number of swipes made in the given journey, a number of wipes made in the given journey, a number of clicks made in the given journey, a number of selections made in the given journey, and a number of screens encountered in the given journey.

15. The method of claim 14, wherein said usage information acquired for each of the plurality of different applications in the given journey, further includes a frequency of security checks in the given journey and a type of a given security check in the given journey.

16. The method of claim 15, wherein the analyzing of the usage information to determine the set of scores for each of the plurality of different applications, further comprises assigning a different score based on the type of the given security check in the given journey.

17. The method of claim 13, wherein the analyzing of the usage information to determine the set of scores for each of the plurality of different applications further comprises determining a type of journey of the given journey from a plurality of defined journeys, wherein the type of journey is determined based on a sequence of user interactions from a start point to an endpoint of the given journey in the user session.

18. The method of claim 13, wherein the analyzing of the usage information to determine the set of scores for each of the plurality of different applications, further comprises detecting and discarding native device inputs as a part of the usage information, wherein the native device inputs are user interactions during the user session independent of the plurality of user interfaces of each application.

19. The method of claim 13, wherein the method further comprises automatically generating a second visual representation that comprises one or more recommendations for specific user interface components for remediation to lower the friction score for one or more applications of the plurality of different applications that are above a threshold.

20. A non-transitory computer-readable medium having stored therein, computer-implemented instructions which when executed by a computer causes the computer to execute operations, the operations comprising:
acquiring, from a plurality of user devices, usage information of a plurality of different applications of a plurality of different service providers associated with a common service, wherein the usage information of each application is indicative of a plurality of user interactions with a plurality of user interfaces of each application during the user session;
analyzing said usage information to determine a set of scores for each of the plurality of different applications, wherein each score of the set of scores is determined for each of the plurality of user interactions in a given journey of accessing a corresponding application, and wherein the analysis of said usage information comprises detecting and discarding a portion of usage information for one or more first user interfaces of each application that do not require any user input;
determining a friction score for the given journey for each of the plurality of different applications associated with the common service based on the determined set of scores, wherein each determined friction score is indicative of a corresponding digital user experience for the given journey for each of the plurality of different applications;
generating a first visual representation that comprises the plurality of user interactions, the determined set of scores corresponding to the plurality of user interactions, and the determined friction score for the given journey for each of the plurality of different applications; and
controlling display of the generated first visual representation such that a ranking of the plurality of different applications of the plurality of different service providers associated with the common service is indicated in accordance with the determined friction score for the given journey for each of the plurality of different applications.

* * * * *